Aug. 3, 1948.  M. G. NELSEN  2,446,299
INTERLOCKING RELAY
Filed Feb. 14, 1944  2 Sheets-Sheet 2
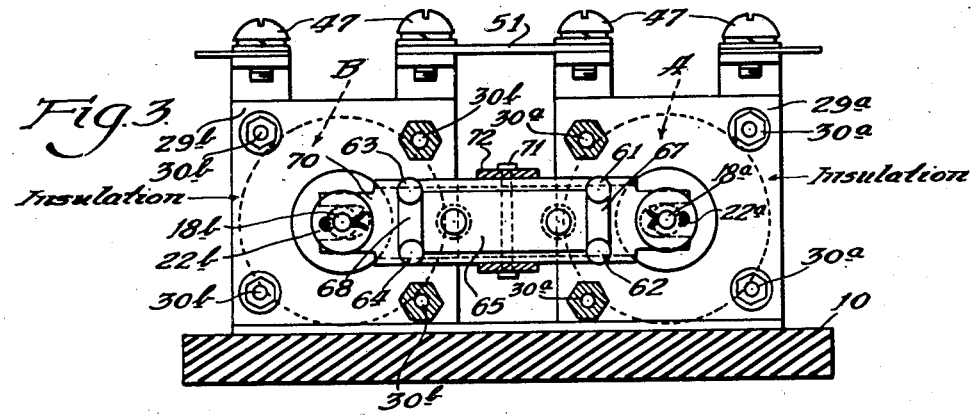
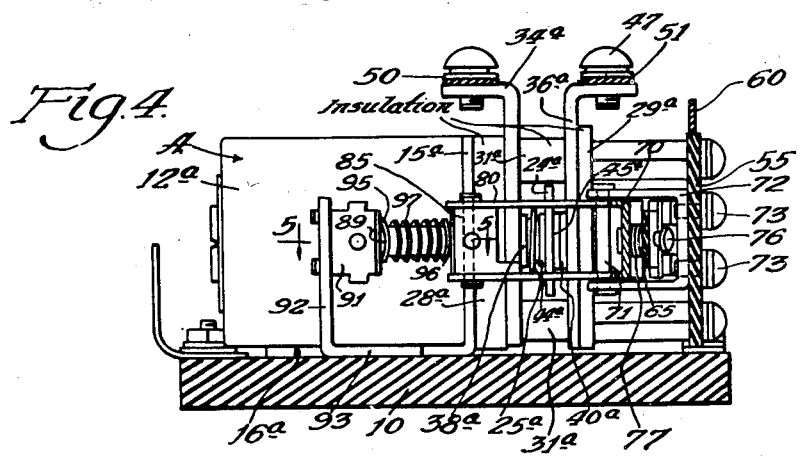
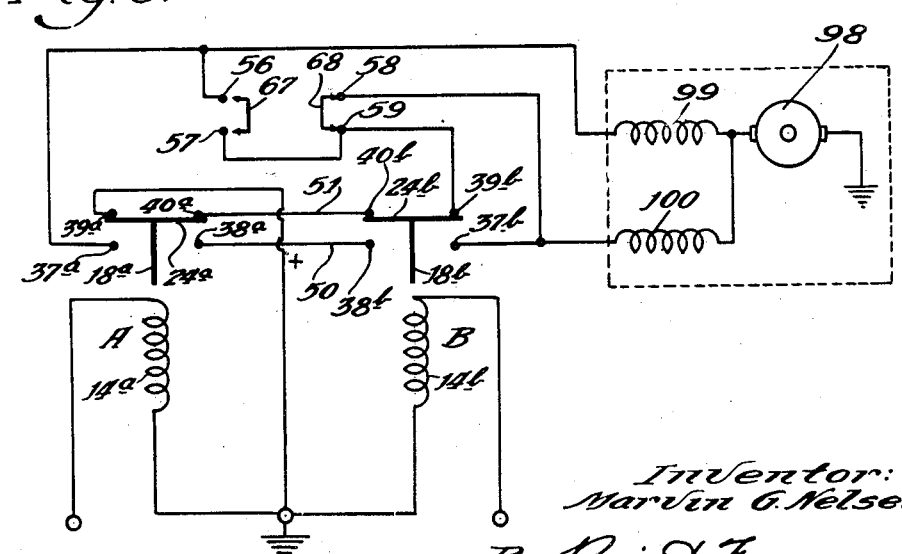
Inventor:
Marvin G. Nelsen
By: Bair & Freeman
Attorneys Patented Aug. 3, 1948

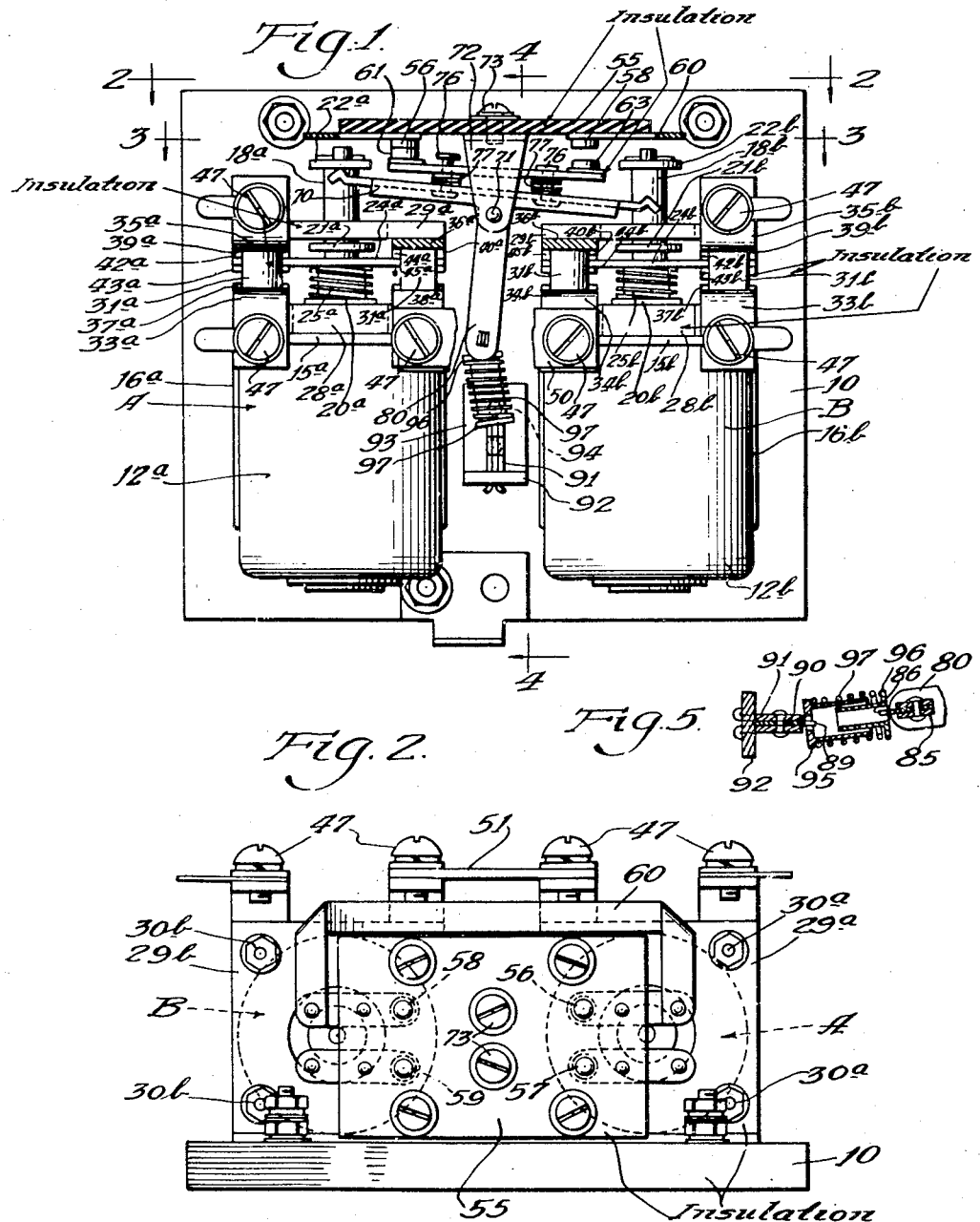

2,446,299

UNITED STATES PATENT OFFICE 2,446,299

INTERLOCKING RELAY

Marvin G. Nelsen, Skokie, Ill., assignor to Guardian Electric Manufacturing Co., Chicago, Ill., a corporation of Illinois Application February 14, 1944, Serial No. 522,361

1 Claim. (Cl. 200—98)

This invention relates to improvements in control devices for split-field, series types of motors, adapted to be driven in either direction, and more particularly to control devices for dynamically braking and instantaneously arresting the motor incident to opening the main contacts of the motor circuit.

Control devices of this type are adapted to a relatively wide field of use wherein apparatus or mechanisms are to be motor driven in either of two directions or within a predetermined range of movement from a neutral or zero starting position. Such controls are especially suitable for aircraft use, for controlling the position of wing flaps, trim tabs, landing gear and other devices and apparatus.

One of the objects of this invention is to provide a novel control of the character indicated for controlling a split-field series type of motor, wherein the opposite section of the field winding is energized when the circuit for the section of the field previously energized is opened, to effect dynamic braking and instantaneous arresting of the motor.

Another object is to provide a novel control of the character indicated, having separate dual sets of motor contacts for each field section of the motor and separate sets of shunt contacts for each field section of the motor, together with interconnections for making and breaking the contacts, whereby a set of motor contacts and a set of shunt contacts are caused to close and short circuit the field section previously energized for effecting dynamic braking and instantaneous arresting of the motor.

A further object is to provide a novel control of the character indicated having separate sets of shunt contacts for the respective field sections of a split-field series type of motor and electro-magnetically actuated snap-action toggle means for controlling the making and breaking of the shunt contacts.

Still another object is to provide a novel control device of the character indicated comprising two separate electro-magnetic devices for respectively controlling sets of contacts for branch electric circuits to drive the motor in opposite directions, together with means interlocking the movable armatures of the magnetic devices for precluding simultaneously energization of said two magnetic devices.

Other objects and advantages of this invention will be apparent from the following description, taken in connection with the accompanying drawings in which:

Figure 1 is a plan view of the control device embodying the present invention, with parts broken away to show details of construction.

Figure 2 is an end elevational view of the device, taken substantially as indicated at line 2—2 on Figure 1.

Figure 3 is a transverse sectional view through the device, taken substantially as indicated at line 3—3 on Figure 1.

Figure 4 is a sectional view showing the toggle arrangement and interlocking connections, and taken substantially as indicated at line 4—4 on Figure 1.

Figure 5 is a sectional view through the snap-action toggle connection, taken substantially as indicated at line 5—5 on Figure 4.

Figure 6 is a wiring diagram including my novel control device, shown in connected relation to the respective field sections of a split-field series type of motor.

The control device embodying the present invention may for convenience be termed an interlocking relay and is constructed as a unitary device, including a panel 10 of insulating material, to which the operating parts of the device are attached.

Mounted on the base 10, are a pair of electro-magnetic devices indicated generally at A and B, of identical construction, and each having associated therewith identical sets of motor circuit contacts. For convenience in understanding the construction and operation of the device, similar parts of the electro-magnetic devices and contact structures will be accorded similar reference numerals together with the designations of the small reference letters "a" and "b" for the respective electro-magnets A and B. The electro-magnet A and associated contacts will now be described and it may be understood that the electro-magnet B and its associated contacts is of identical construction. The electro-magnet A includes a cylindrical housing 12a formed as a sheet metal stamping, enclosing a coil 14a. The housing 12a, which is of cup shape form, is rigidly attached at its open end to a rectangular flange 15a, which flange terminates at its lower end in a horizontal foot 16a, secured to the panel 10 by screws (not shown). Mounted for reciprocable movement within the coil 14a, is an armature or plunger 18a. Fixedly mounted on the plunger 18a, in axially spaced apart relation, are three discs 20a, 21a and 22a of insulating material. Loosely mounted on the plunger 18a, in insulated relation thereto, between the discs 20a and 21a, disposed contact bar 24a, urged in an outwardly direction by a coil spring 25a, surrounding the plunger.

Rigidly secured to the mounting flange 15a of the housing of the electro-magnet is a panel 28a of insulating material, and disposed in aligned fixed, forwardly spaced apart relation to said panel 28a, is another panel 29a of insulating material. These panels are rigidly secured in such spaced apart relation to the flange 15a by stud bolts 30a. Surrounding said bolts, intermediate the said panels 28a and 29a, are tubular spacing sleeves 31a, of insulating material. These sleeves, as may be clearly seen in Figure 4 in the drawings, serve to provide guideways for confining the movable contact bar 24a, in its horizontal movement incident to energization and deenergization of the electro-magnet A. Mounted on the adjacent surfaces of the insulating panels 28a and 29a, adjacent the outer ends thereof as seen in Figure 1 of the drawings, are upwardly extending fixed contact members 33a, 34a, 35a and 36a, provided with contact buttons 37a, 38a, 39a and 40a respectively. Said fixed contact bars are rigidly secured to the respective panels by the stud bolts 30a and the insulating sleeves 31a extend into apertures (not shown) formed in the respective contact bars for insulating said bars from each other. Disposed in alignment with the respective sets of contacts of said fixed members are contact buttons 42a, 43a, 44a and 45a, at opposite ends of the movable contact bar 24a. The upper ends of the fixed contact members terminate above said panels 28a and 29a, in horizontal flanges, as seen in Figure 4 of the drawings, and are provided with binding screws 47, for the connection of conductor wires, or for connection of certain of the fixed contact members together.

The fixed contact member 34a of the magnet A, and the fixed contact member 34b of the magnet B, are connected together by a bar 50, of electrically conductive material, and it may be understood that this bar is adapted to be directly connected to the positive side of a storage battery in the electric circuit hereinafter described. The fixed contact members 36a and 36b of the respective magnets are likewise connected by a bar 51 of electrically conductive material. The respective sets of contacts above described for each of the electro-magnets are adapted to be connected respectively into branch electric circuits for respectively controlling separate field sections of a split-field, series-type motor.

Fixedly mounted at the forward end of the panel 10 is an upright panel 55 of insulating material, rigidly attached to the electro-magnet assembly by extensions of the two inner most pair of stud bolts 30a and 30b. Mounted on the inner face of the panel 55, are two pairs of transversely spaced-apart contacts 56, 57 and 58, 59, as seen in Figure 2 of the drawings. The contacts 56 and 58 are connected together by a bar 60 of electrically conductive material as seen in Figures 1 and 2 of the drawings. Cooperating with the respective pairs of contacts 56, 57 and 58, 59 are similar sets of contacts indicated at 61, 62 and 63, 64, mounted on a panel of insulating material 65. The contacts 61 and 62 are connected by a bridging bar 67 and the contacts 63 and 64 are connected by a bridging bar 68 as seen in Figure 3 of the drawings. The panel 65 is adapted to be rocked by a snap-action toggle mechanism in opposite directions, for rapidly and yieldingly urging, alternately, the respective sets of contacts 61, 62 into and out of cooperative engagement with the fixed contacts 56 and 57, and the other sets of contacts 63, 64 into and out of engagement with the fixed contacts 58 and 59, by toggle mechanism as will now be described.

A T-shaped rocking member 70 in the form of a sheet metal stamping, is pivotally mounted on a pin 71, carried by a clevis form of bracket 72, which is rigidly secured to the inner surface of the panel 55 by screws 73. The outer ends of the member 70 are forked, as clearly seen in Figure 3 of the drawings, and straddled as a yoke, the respective plungers of the electro-magnets A and B, with the fork ends interposed respectively between the outermost insulating discs 22a and 22b, and the adjacent insulating panels 29a and 29b of the respective electro-magnets. The insulating panel 65, carrying the respective sets of contacts 61, 62 and 63, 64 is resiliently mounted on the member 70, by headed rivets 76, with coil springs 77, surrounding the rivets and interposed between said panel 65 and the member 70 as clearly seen in Figure 1 of the drawings. The headed rivets 76 are rigidly attached to the member 70 and their opposite ends are freely movable through the panel 65, so that in one position of rocked adjustment of the member 70, one of the coil springs 77 is compressed and tends to yieldingly urge the corresponding end of the panel 65 in a forwardly direction so that the contacts at said end of the panel are yieldingly urged into cooperative engagement with the correspondingly aligned pair of shunt contacts on the panel 55.

The rocking member 70 includes a rearwardly and centrally extending arm 80, formed of two vertically spaced apart members which are continuations of the sides of said member 70, as clearly seen in Figure 4 of the drawings. The rocking member 70, together with the panel 65 and its contacts, is rocked about the pivot 71 by the engagement of the outer end of said member 70, with the insulating disc at the outer end of the plunger of one of the electro-magnets. To insure that the respective sets of contacts carried by the panel 65 are moved into and out of engagement with their cooperating contacts in a manner to insure positive making and breaking and to reduce arcing, I provide a snap action toggle connection associated with the arm 80 of the rocking member 70. Fixedly secured in the outer end of the two vertically spaced apart members of the arm 80 is a built up member 85, composed of three sheets of metal, the innermost sheet as indicated at 86, being extremely thin and projecting at its rear edge a short distance beyond the other sheets of metal, and formed with a tapered tang 87 substantially centrally of the distance between the members comprising the arm 80. Mounted in aligned relation to the tang 87, is a similar tang 89 formed on the projecting edge of an intermediate relatively thin sheet 90 of a three-ply built up member 91, which in turn is rigidly attached to an upright leg 92 of an angular bracket 93, the horizontal leg of which is rigidly attached to the mounting base 10, by means of screws 94. The use of the relatively thin sheets of metal 86 and 90, is so that the edges adjacent the respective tangs, form knife edge rocking seats for the flanges of a pair of tubular, flanged, telescoping eyelet members 95 and 96, the apertures of which are disposed in surrounding relation to the respective tangs, and with the flanges thereof seated on the edges of the thin sheets of metal 86 and 90, as clearly seen in Figure 5 of the drawings. Surrounding the tubular eyelets, is a coil spring 97 having its opposite ends abutting the inner face of the respective flanges of the eyelet members and normally tending to urge the eyelets apart. It will now be apparent that when the arm 80 is moved from the position seen in Figure 1 of the drawings, by energization of the electro-magnet A, in a counter clockwise direction, the coil spring 97 is compressed and energy built up therein, and as the arm moves slightly beyond the plane of alignment of the respective tangs 86 and 89, the built up energy of the spring 97 will act with a snap action to quickly shift the arm 80 to a position opposite that seen in Figure 1 of the drawings. Such movement of the rocking member 70 thus effects rapid making and breaking of contact engagement between the contacts carried on the movable panel 65 and the shunt contacts on the fixed panel 55.

For convenience the respective sets of cooperating bridging contacts carried by the movable panel 65 and the shunt contacts on the fixed panel 55 may all be referred to as shunt contacts because of their connection in shunt or short circuit relation to portions of the circuits for the respective field sections of the motor.

It will now be apparent when the electro-magnets are deenergized and assume a position as seen in Figure 1 of the drawings, one pair of motor contacts of each dual set is closed, and the other pair are open, and when either magnet is energized, the other pair of motor contacts is closed and the first mentioned pair are opened. For example, when the electro-magnet A is energized, the plunger 18a is retracted and the insulating disc 21a abuts against the movable contact bar 24a, moving its contacts 42a and 44a out of engagement with the fixed contacts 39a and 40a, and causes engagement of the contacts 43a and 45a respectively with contacts 37a and 38a. Such inward movement of the plunger 18a, acting through the insulating disc 22a, causes rocking movement of the member 70 about its pivot pin 71, breaking engagement between contact buttons 61, 62 and shunt contact buttons 56, 57, and effecting engagement of contact buttons 63, 64 with the shunt contact buttons 58, 59. When the solenoid B is energized the dual sets of motor contacts controlled thereby are similarly actuated and the shunt contacts are actuated in opposite relation, through the toggle action above described. By virtue of this construction, either of the electro-magnets may be energized and deenergized a number of times in sequence, but due to the interlocking construction provided by the toggle action and the rocking member 70, at no time can both electro-magnets be simultaneously energized.

*Operation*

For convenience in understanding of the present invention I have shown in the wiring diagram of the drawing a representation of a split field series type motor indicated at 98, including split field sections indicated at 99 and 100. For purposes of clarity, in the drawings the control device is illustrated without any wiring connections. As may be seen in the wiring diagram, normally when both electro-magnets A and B are deenergized the main operating motor contacts of the respective electro-magnets are open. When the electro-magnet A is energized the contact bar 24a is moved out of engagement with contacts 39a and 40a, and completes the motor circuit through the contacts 37a and 38a, and positive side of the battery connector bar 50, for energizing of the field section 99 of the motor, the opposite side of which circuit is connected through the armature to ground as seen in the drawing. As long as the magnet A remains energized the motor continues to rotate in one direction. Incident to such energization of the magnet A the shunt contacts 58 and 59 are bridged by the connector bar 68 to partially complete a shunt or short circuit for the field section 100. When the electro-magnet A is deenergized and the contact bar 24a moves out of engagement with contacts 37a and 38a and bridges the contacts 39a and 40a, the shunt or short circuit for the field section 100, as above described, is completed. When the motor circuit is broken by the opening of contacts 37a and 38a, the armature will tend to overrun. This causes the motor to act as a generator. When contacts 39a and 40a are closed, this generated current flows through armature 98, field 100, relay contacts 58, 59, shorting bar 68, contacts 39b and 40b, contacts 40a and 39a to ground. This current sets up a magnetic flux opposing the rotation of the armature, causing the armature to come to an almost immediate stop and thereby dynamically braking the motor. It will be seen that this same condition attains each time that the electro-magnet A is energized and deenergized. When the electro-magnet B is energized the contact bar 24b completes the motor circuit for the field section 100 through the contacts 37b, 38b, and the battery current supply bar 50, to the field section 100 and through armature of the motor directly to ground for driving the motor in the opposite direction. Such energization of the electro-magnet B causes the shunt circuit actuating mechanism to be reversed so that the shunt contacts 56, 57 are bridged by the connector bar 67. When the magnet B is deenergized, the contact bar 24b opens the main motor circuit by breaking connection between contacts 37b and 38b, and reestablishes connection between contacts 39b and 40b, to complete the shunt or short circuit of the field section 99, so as to dynamically brake and instantaneously arrest rotation of the motor.

It will be apparent that by virtue of the construction above described, it is impossible for both field sections of the motor to be simultaneously energized by current supplied from the battery, and only one field section may be energized at a time so that the motor may be readily controlled and driven in either direction, depending upon which of the two electro-magnets A or B is energized. Furthermore, my control device permits rapid and accurate control and positioning of various motor driven mechanisms or apparatus.

Although I have herein shown and described a preferred embodiment of my invention, manifestly it is capable of modification and rearrangement of parts without departing from the spirit and scope thereof. I do not, therefore, wish to be understood as limiting this invention to the precise embodiment herein disclosed, except as I may be so limited by the appended claim.

I claim as my invention:

In a control device for use with a motor, the combination of a pair of electromagnets each having a movable armature, contactor bars connected to each armature, separate, dual sets of motor contacts for each magnet controlled by the contactor bars of the respective magnets, one pair of contacts of each set being adapted to be closed by a contactor bar when the corresponding magnet is deenergized and the other pair of contacts of each set being adapted to be closed by said contactor bar, when the corresponding magnet is energized, a separate set of shunt contacts for each magnet connected respectively in circuit with said one pair of motor contacts, and means actuated in response to alternate energizations of said magnets for closing their respective pairs of shunt contacts, said means including a rockable member pivotally mounted adjacent the center of its length and having its opposite ends operably connected to said armatures, said member being rocked in opposite directions incident to alternate energization of said magnets, resiliently mounted contact elements carried on and in insulated relation to said member and positioned for cooperative engagement with the respective pairs of shunt contacts, whereby alternate energization of said magnets rocks said member in opposite directions for causing the contact elements to close alternately the corresponding pairs of shunt contacts, and a snap-action device connected to and operated by said means in response to alternate energization of said magnets for controlling the make and break of said pairs of shunt contacts.

MARVIN G. NELSEN.

REFERENCES CITED

The following references are of record in the file of this patent:

UNITED STATES PATENTS

| Number | Name | Date |
| --- | --- | --- |
| 489,674 | Goold | Jan. 10, 1893 |
| 811,773 | Gomborow | Feb. 6, 1906 |
| 965,671 | Whittingham | July 26, 1910 |
| 1,291,039 | Lowenstein et al. | Jan. 14, 1919 |
| 1,486,386 | Laing | Mar. 11, 1924 |
| 1,522,766 | Wilms | Jan. 13, 1925 |
| 1,550,611 | Howe | Aug. 18, 1925 |
| 1,614,192 | Ewald | Jan. 11, 1927 |
| 1,954,365 | Reich | Apr. 10, 1934 |
| 1,983,137 | Koons | Dec. 4, 1934 |
| 2,396,972 | Russell | Mar. 19, 1946 |

FOREIGN PATENTS

| Number | Country | Date |
| --- | --- | --- |
| 267,502 | Great Britain | Dec. 15, 1927 |